United States Patent
Yasar et al.

(10) Patent No.: US 11,287,181 B2
(45) Date of Patent: Mar. 29, 2022

(54) AUTOMATED DIAGNOSTICS FOR TRANSPORT REFRIGERATION UNITS

(71) Applicant: CARRIER CORPORATION, Palm Beach Gardens, FL (US)

(72) Inventors: Murat Yasar, West Hartford, CT (US); Marc Beasley, Beverly, MA (US); Mark E. Cywilko, Jamesville, NY (US); Jeffrey Allen Leshuk, Davis, CA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 468 days.

(21) Appl. No.: 16/088,577

(22) PCT Filed: Mar. 28, 2017

(86) PCT No.: PCT/US2017/024453
§ 371 (c)(1),
(2) Date: Sep. 26, 2018

(87) PCT Pub. No.: WO2017/172701
PCT Pub. Date: Oct. 5, 2017

(65) Prior Publication Data
US 2020/0298672 A1    Sep. 24, 2020

Related U.S. Application Data

(60) Provisional application No. 62/314,133, filed on Mar. 28, 2016.

(51) Int. Cl.
*F25D 29/00* (2006.01)
*B60H 1/32* (2006.01)
*F25D 11/00* (2006.01)

(52) U.S. Cl.
CPC ......... *F25D 29/006* (2013.01); *B60H 1/3232* (2013.01); *F25D 29/008* (2013.01);
(Continued)

(58) Field of Classification Search
CPC .... F25D 11/003; F25D 29/003; F25D 29/006; F25D 29/008; F25D 2700/12;
(Continued)

(56) References Cited

U.S. PATENT DOCUMENTS 6,006,171 A    12/1999    Vines et al.
6,192,325 B1    2/2001    Piety et al.
(Continued)

FOREIGN PATENT DOCUMENTS

CN    1412485 A    4/2003
CN    2731374 Y    10/2005
(Continued)

OTHER PUBLICATIONS

From Farm to Fork: Safe Food Transport and Storage, Oct. 12, 2009 (Year: 2009).*
(Continued)

*Primary Examiner* — Marc E Norman
(74) *Attorney, Agent, or Firm* — Cantor Colburn LLP

(57) ABSTRACT

A system for managing transport refrigeration units (28) is provided. The system includes a storage device (80) to store transport parameters (82) associated with a transport refrigeration unit (28). The storage device storing historical transport parameters (84) for other transport refrigeration units (28). Also included is an equipment management system (90) coupled to the storage device, the equipment management system (90) including: a diagnostic module (92) to determine a condition of the transport refrigeration unit (28) in response to the transport parameters (82); a predictive maintenance module (94) to determine a need for upcoming
(Continued)

maintenance of the transport refrigeration unit (28) in response to the transport parameters (82); and a remaining life module (96) to determine a remaining life of at least one component of the transport refrigeration unit (28) in response to the transport parameters (82).

14 Claims, 2 Drawing Sheets

(52) U.S. Cl.
CPC ... *B60H 2001/3266* (2013.01); *B60L 2200/36* (2013.01); *F25D 11/003* (2013.01); *F25D 29/003* (2013.01); *F25D 2700/12* (2013.01)

(58) Field of Classification Search
CPC ............... B60H 1/3232; B60H 1/0075; B60H 2001/3266; B60L 2200/36
See application file for complete search history.

(56) References Cited

U.S. PATENT DOCUMENTS

| | | | |
|---|---|---|---|
| 6,295,510 B1 | 9/2001 | Discenzo | |
| 6,356,822 B1* | 3/2002 | Diaz | G07C 5/008 |
| | | | 340/438 |
| 6,571,158 B2 | 5/2003 | Sinex | |
| 6,675,167 B2 | 1/2004 | Takahashi et al. | |
| 6,738,748 B2 | 5/2004 | Wetzer | |
| 7,124,059 B2 | 10/2006 | Wetzer et al. | |
| 7,440,906 B1 | 10/2008 | Wetzer et al. | |
| 7,877,235 B2 | 1/2011 | McConnell et al. | |
| 8,285,438 B2 | 10/2012 | Mylaraswamy et al. | |
| 8,473,089 B2 | 6/2013 | Albarede et al. | |
| 8,799,042 B2 | 8/2014 | Hampapur et al. | |
| 2003/0132850 A1 | 7/2003 | Ozawa | |
| 2003/0158638 A1* | 8/2003 | Yakes | G01M 17/00 |
| | | | 701/22 |
| 2009/0092402 A1 | 4/2009 | Mizuno | |
| 2011/0118905 A1 | 5/2011 | Mylaraswamy et al. | |
| 2011/0193710 A1 | 8/2011 | McIlvain et al. | |
| 2012/0017618 A1 | 1/2012 | Price et al. | |
| 2012/0060529 A1 | 3/2012 | Singh et al. | |
| 2014/0250925 A1* | 9/2014 | Prabowo | F25B 49/005 |
| | | | 62/62 |
| 2015/0363750 A1 | 12/2015 | Svensson | |
| 2016/0131605 A1* | 5/2016 | Hamrouni | B60H 1/00014 |
| | | | 702/183 |
| 2017/0109712 A1* | 4/2017 | Bullock | H04L 67/26 |

FOREIGN PATENT DOCUMENTS

| | | |
|---|---|---|
| CN | 101124436 A | 2/2008 |
| CN | 101929771 A | 12/2010 |
| CN | 104053613 A | 9/2014 |
| JP | H02106422 A | 4/1990 |
| JP | H09286223 A | 11/1997 |
| JP | H11237260 A | 8/1999 |
| JP | 2000121238 A | 4/2000 |
| JP | 2009251822 A | 10/2009 |
| JP | 2010025439 A | 2/2010 |
| WO | 2005052706 A1 | 6/2005 |
| WO | 2012079753 A1 | 6/2012 |

OTHER PUBLICATIONS

Notification of Transmittal of the International Search Report and The Written Opinion of The International Searching Authority, or The Declaration for International Application No. PCT/US2017/024453; dated May 26, 2017; Report Received Date: Jun. 5, 2017; 13 pages.
Chinese Office Action dated Apr. 14, 2020 for Application No. 201780021425.2; 13 pages.
Search Report From Singapore for Application No. 11201808308S; dated Dec. 26, 2019; 2 pages.
Written Opinion From Singapore for Application No. 11201808308S; dated Dec. 27, 2019; 5 pages.
EP Office Action for Application No. 17 716 369.8-1009 dated Jun. 30, 2021; 10 pages.

* cited by examiner

AUTOMATED DIAGNOSTICS FOR TRANSPORT REFRIGERATION UNITS

BACKGROUND OF THE DISCLOSURE

The embodiments disclosed herein generally relate to cold chain distribution systems, and more specifically to an apparatus and a method for managing a transport refrigeration unit within a cold chain distribution system.

Typically, cold chain distribution systems are used to transport and distribute perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

The components of a transport refrigeration unit may be periodically inspected and repaired for scheduled maintenance often regardless of the actual utilization on the unit. Further unpredicted unscheduled maintenance causes unplanned down time of the unit. Improved systems and particularly improved maintenance prediction would provide both cost and efficiency benefits.

BRIEF DESCRIPTION OF THE DISCLOSURE

According to one embodiment, a system for managing transport refrigeration units is provided. The system includes a storage device to store transport parameters associated with a transport refrigeration unit. The storage device storing historical transport parameters for other transport refrigeration units. Also included is an equipment management system coupled to the storage device, the equipment management system including: a diagnostic module to determine a condition of the transport refrigeration unit in response to the transport parameters; a predictive maintenance module to determine a need for upcoming maintenance of the transport refrigeration unit in response to the transport parameters; and a remaining life module to determine a remaining life of at least one component of the transport refrigeration unit in response to the transport parameters.

In addition to one or more of the features described above, or as an alternative, further embodiments of the system may include the diagnostic module activates an alarm when the condition of the transport refrigeration unit is outside of a selected range of conditions.

In addition to one or more of the features described above, or as an alternative, further embodiments of the system may include the predictive maintenance module activates an alarm when the need for upcoming maintenance of the transport refrigeration system is determined.

In addition to one or more of the features described above, or as an alternative, further embodiments of the system may include the remaining life module activates an alarm when the remaining life of at least one component of the transport refrigeration unit equals a selected value.

In addition to one or more of the features described above, or as an alternative, further embodiments of the system may include that the storage device stores a maintenance history of the transport refrigeration unit.

In addition to one or more of the features described above, or as an alternative, further embodiments of the system may include that the transport parameters include parameters of the transport refrigeration unit including at least one of operating temperature, operating pressure, operating vibrations, operation cycles, and operation duration of the transport refrigeration unit.

In addition to one or more of the features described above, or as an alternative, further embodiments of the system may include that the transport parameters include at least one location of the transport refrigeration unit.

In addition to one or more of the features described above, or as an alternative, further embodiments of the system may include that the transport parameters include weather data experienced by the transport refrigeration unit.

In addition to one or more of the features described above, or as an alternative, further embodiments of the system may include that the transport parameters include quality inspections of perishable goods carried by the transport refrigeration unit.

In addition to one or more of the features described above, or as an alternative, further embodiments of the system may include that the transport parameters include manually entered data.

According to another embodiment, a method of managing transport refrigeration units, the method is provided. The method includes storing, using a storage device, transport parameters associated with a transport refrigeration unit, the storage device storing historical transport parameters for other transport refrigeration units. The method also includes monitoring, using an equipment management system, the transport refrigeration unit, the equipment management system coupled to the storage device, the equipment management system including: a diagnostic module to determine a condition of the transport refrigeration unit in response to the transport parameters; a predictive maintenance module to determine a need for upcoming maintenance of the transport refrigeration unit in response to the transport parameters; and a remaining life module to determine a remaining life of at least one component of the transport refrigeration unit in response to the transport parameters.

In addition to one or more of the features described above, or as an alternative, further embodiments of the method may include activating an alarm, using the diagnostic module, when the condition of the transport refrigeration unit is outside of a selected range of conditions.

In addition to one or more of the features described above, or as an alternative, further embodiments of the method may include activating an alarm, using the predictive maintenance module, when the need for upcoming maintenance of the transport refrigeration unit is determined.

In addition to one or more of the features described above, or as an alternative, further embodiments of the method may include activating an alarm, using the remaining life module, when the remaining life of at least one component of the transport refrigeration unit equals a selected value.

In addition to one or more of the features described above, or as an alternative, further embodiments of the method may include that the storage device stores a maintenance history of the transport refrigeration unit.

In addition to one or more of the features described above, or as an alternative, further embodiments of the method may include that the transport parameters include parameters of the transport refrigeration unit including at least one of operating temperature, operating pressure, operating vibrations, operation cycles, and operation duration of the transport refrigeration unit.

In addition to one or more of the features described above, or as an alternative, further embodiments of the method may include that the transport parameters include at least one location of the transport refrigeration unit.

In addition to one or more of the features described above, or as an alternative, further embodiments of the method may include that the transport parameters include weather data experienced by the transport refrigeration unit.

In addition to one or more of the features described above, or as an alternative, further embodiments of the method may include that the transport parameters include quality inspections of perishable goods carried by the transport refrigeration unit.

In addition to one or more of the features described above, or as an alternative, further embodiments of the method may include that the transport parameters include manually entered data.

Other aspects, features, and techniques of the invention will become more apparent from the following description taken in conjunction with the drawings.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
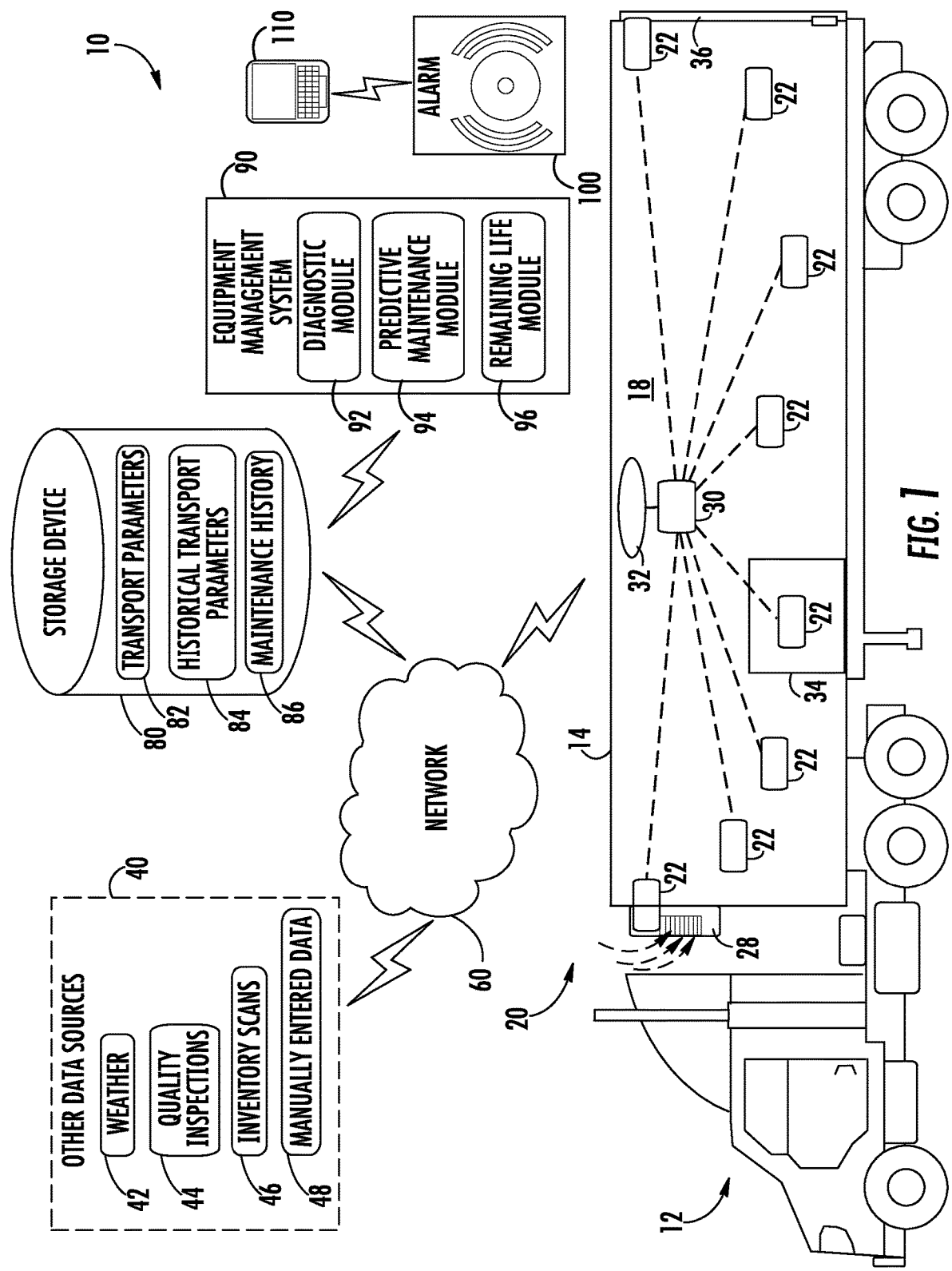
FIG. 1 illustrates a schematic view of a system for managing transport refrigeration units for use in a cold chain distribution system, according to an embodiment of the present disclosure.
Figure 2:
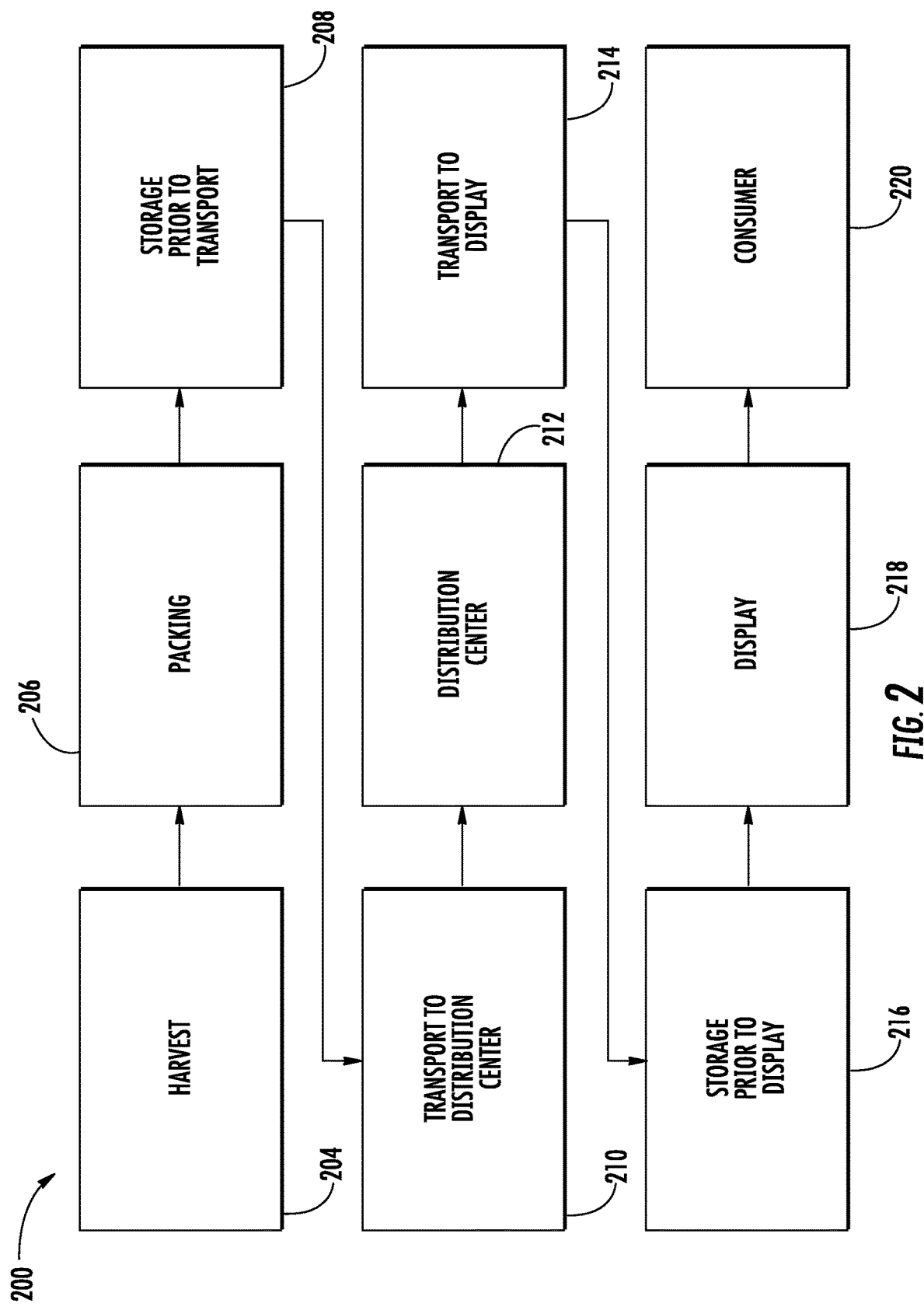
FIG. 2 illustrates a schematic view a cold chain distribution system that may incorporate embodiments of the present disclosure.

Referring now to the drawings, FIG. 1 illustrates a schematic view of a system 10 for managing transport refrigeration units for use in a cold chain distribution system, according to an embodiment of the present disclosure. FIG. 2 illustrates a schematic view a cold chain distribution system 200 that may incorporate embodiments of the present disclosure. Typically, transport refrigeration systems 20 are used to transport and distribute perishable goods and environmentally sensitive goods (herein referred to as perishable goods 34). In the illustrated embodiment, a transport refrigeration system 20 includes an environmentally controlled container 14, a transport refrigeration unit 28 and perishable goods 34. The container 14 may be pulled by a tractor 12. It is understood that embodiments described herein may be applied to shipping containers that are shipped by rail, sea, or any other suitable container, without use of a tractor 12. The container 14 may define an interior compartment 18.

In the illustrated embodiment, the transport refrigeration unit 28 is associated with a container 14 to provide desired environmental parameters, such as, for example temperature, pressure, humidity, carbon dioxide, ethylene, ozone, light exposure, vibration exposure, and other conditions to the interior compartment 18. In further embodiments, the transport refrigeration unit 28 is a refrigeration system capable of providing a desired temperature and humidity range. The perishable goods 34 may include but are not limited to fruits, vegetables, grains, beans, nuts, eggs, dairy, seed, flowers, meat, poultry, fish, ice, blood, pharmaceuticals, or any other suitable cargo requiring cold chain transport.

In the illustrated embodiment, the transport refrigeration system 20 includes sensors 22. The sensors 22 may be utilized to monitor transport parameters 82 internal and external to the container 14. The transport parameters 82 monitored by the sensors 22 may include but are not limited to temperature, pressure, humidity, carbon dioxide, ethylene, ozone, light exposure, vibrations, and other conditions in the interior compartment 18. Accordingly, suitable sensors 22 are utilized to monitor the desired parameters. Advantageously, sensors 22 may be selected for certain applications depending on the perishable cargo to be monitored and the corresponding environmental sensitivities. In an embodiment, temperatures are monitored. In certain embodiments, a user desires to maintain and monitor temperatures or other parameters within an acceptable range. As seen in FIG. 1, the sensors 22 may be placed directly on the perishable goods 34.

Further, as in the illustrated embodiment, sensors 22 may be used to monitor various transport parameters 82 of the transport refrigeration system 20. These sensors 22 may be placed in a variety of locations including but not limited to on the transport refrigeration unit 28, on a door 36 of the container 14 and throughout the interior compartment 18. The sensors 22 may be placed directly within the transport refrigeration unit 28 to monitor the performance of the transport refrigeration unit 28. Individual components internal to the transport refrigeration unit 28 may also be monitored by sensors 22 to detect performance aspects, such as, for example usage cycles, duration, temperatures and pressure of individual components. As seen, the sensors 22 may also be placed on the door 36 of the container 14 to monitor the position of the door 36. Whether the door 36 is open or closed affects both the temperature of the container 14 and the performance of the transport refrigeration unit 28. For instance, in hot weather, an open door 36 will allow cooled air to escape from the container 14, causing the temperature of the interior compartment 18 to rise, which creates additional stress on the transport refrigeration unit 28 by forcing the transport refrigeration unit 28 to work harder to cool the interior compartment 18. Additionally, the global positioning system (GPS) location may also be detected by the sensors 22. The GPS location may help in providing information from other data sources 40 regarding local weather 42 (including solar gain) experienced by the container 14 along the travel route. The local weather 42 affects the temperature of the container 14 and thus affects the operation on the transport refrigeration unit 28. For instance, the transport refrigeration unit 28 may have to work harder on a container 14 travelling through a desert that is exposed to long period of heat and solar gain.

As illustrated in FIG. 1, the transport refrigeration system 20 may further include, a controller 30 configured to log a plurality of readings from the sensors 22, known as transport parameters 82, at a selected sampling rate. The controller 30 may be enclosed within the transport refrigeration unit 28 or separate from the transport refrigeration unit 28 as illustrated. The transport parameters 82 may further be augmented with time, position stamps or other relevant information. The controller 30 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an illustrated embodiment, the transport refrigeration system 20 may include a communication module 32 in operative communication with the controller 30 and in wireless operative communication with a network 60. The communication module 32 is configured to transmit the transport parameters 82 to the network 60 via wireless communication. The wireless communication may be, but is not limited to, radio, microwave, cellular, satellite, or another wireless communication method. The network 60 may be but is not limited to satellite networks, cellular networks, cloud computing network, wide area network, or another type of wireless network. The communication module 32 may include a short range interface, wherein the short range interface includes at least one of: a wired interface, an optical interface, and a short range wireless interface.

Transport parameters 82 may also be provided by other data sources 40, as illustrated in FIG. 1. These other data sources 40 may be collected at any point throughout the cold chain distribution system 200, which as illustrated in FIG. 2 may include harvest 204, packing 206, storage prior to transport 208, transport to distribution center 210, distribution center 212, transport to display 214, storage prior to display 216, display 218 and consumer 220. These stages are provided for illustrative purposes and a distribution chain may include fewer stages or additional stages, such as, for example a cleaning stage, a processing stage, and additional transportation stages. The other data sources 40 may include, but are not limited to, weather 42, quality inspections 44, inventory scans 46, and manually entered data 48. The weather 42, as discussed above, has an effect on the operation of the transport refrigeration unit 28 by influencing the temperature of the container 14 during transport (e.g. 210 and 214) but the weather 42 also has other influences on the transport refrigeration unit 28. For instance, the weather 42 prior to and at harvest 204 may have an impact on the quality of the perishable goods 34, which in turn would affect how hard the transport refrigeration unit 28 must work to preserve the perishable goods 34. Moreover, quality inspections 44, similar to the weather 42, may reveal data of the perishable goods 34 that may affect how hard the transport refrigeration unit 28 must work to preserve the perishable goods 34. Quality inspections 44 may be done by a machine or a human being. Quality inspections 44 performed by a machine may be accomplished using a variety of techniques including but not limited to optical, odor, soundwave, infrared, or physical probe.

Further inventory scans 46, may also reveal information about the perishable goods 34 that may affect how hard the transport refrigeration unit 28 must work to preserve the perishable goods 34. For instance, the inventory scan 46 may reveal a temperature of the distribution center 212 where the perishable goods 34 were kept and thus the transport refrigeration unit 28 must either increase or decrease its output to bring the perishable goods 34 to the correct temperature. While the system 10 includes sensors 22 to aid in automation, often times the need for manual data entry is unavoidable. The manually entered data 48 may be input via a variety of devices including but not limited to a cellular phone, tablet, laptop, smartwatch, a desktop computer or any other similar data input device.

In the illustrated embodiment, the system 10 further includes a storage device 80 to store transport parameters 82 associated with the transport refrigeration unit 28. The storage device 80 may also store historical transport parameters 84 and maintenance history 86 of the transport refrigeration unit 28. The storage device 80 may be but is not limited to a random access memory (RAM), read only memory (ROM), or other electronic, optical, magnetic or any other computer readable medium.

In the illustrated embodiment, the system 10 further includes an equipment management system 90. As shown, the equipment management system 90 may include a diagnostic module 92, a predictive maintenance module 94, and a remaining life module 96. The equipment management system 90 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The diagnostic module 92 determines a condition of the transport refrigeration unit 28 in response to the transport parameters 82. The diagnostic module 92 may detect faults in the transport refrigeration unit 28 and provide an indication of the potential sources for the fault. The diagnostic module 92 may compare the transport parameters 82 to thresholds, limits, ranges, etc. to detect faults and then access historical transport parameters 84 to derive one or more potential sources for the fault. The diagnostic module 92 activates an alarm 100 when the condition is, for example, outside of a selected range of conditions.

The predictive maintenance module 94 determines a need for upcoming maintenance of the transport refrigeration unit 28 in response to the transport parameters 82. The predictive maintenance module 94 activates an alarm 100 when the need for upcoming maintenance of the transport refrigeration unit 28 is determined. The predictive maintenance module 94 may detect patterns in the transport parameters (e.g., patterns of high/low compressor outlet pressure) to predict a failure. The predictive maintenance module 94 may also detect trends in the transport parameters 82, compare the transport parameters 82 to thresholds and/or determine rates of change of in transport parameters 82 to determine a need for preventative maintenance. The existence of a series of alarm occurrences (e.g., over-pressure) may indicate the need for preventative maintenance.

The remaining life module 96 determines a remaining life of at least one component of the transport refrigeration unit 28 in response to the transport parameters 82. The remaining life module 96 activates an alarm 100 when the remaining life of at least one component of the transport refrigeration unit 28 equals a selected value. The remaining life module 96 may use a baseline life curve which provides remaining life as a function of time. The baseline life curve may be generated based on the historical transport parameters 84. The baseline life curve may be adjusted or shifted in response to events or transport parameters 82. For example, detection of operation under harsh high ambient conditions may reduce the remaining life whereas the occurrence of a maintenance operation may extend the remaining life.

The diagnostic module 92, predictive maintenance module 94, and remaining life module 96 may utilize historical transport parameters 84 from other transport refrigeration units and the maintenance history 86 of the current transport refrigeration unit 28 in their determinations. The historical transport parameters 84 may provide information such as, for example, life curves, failure rates, and a selected range of conditions for each component of the transport refrigeration unit 28. The selected range of conditions may define the normal operating conditions of component of the transport refrigeration unit 28. Operation outside of the selected range of conditions may indicate an issue with a component of the transport refrigeration unit 28. The maintenance history 86 may help indicate persistent issues with a component of the transport refrigeration unit 28. The maintenance history 86 may also help the predictive maintenance module 94 adjust the maintenance schedule of the transport refrigeration unit 28.

The alarm 100 may be an alert sent to a user device 110 such as, for example, a cellular phone, tablet, laptop, smart-watch, desktop computer or any similar device. The alarm 100 may be an instantaneous alarm or a scheduled alarm for a later time. For instance, the predictive maintenance module 94 may predict that a component of a transport refrigeration unit 28 should be scheduled for maintenance in two months, so the predictive maintenance module 94 may schedule the alarm 100 to go off a little in advance of the newly scheduled maintenance date. Whereas, if the diagnostic module 92 determines that a component of the transport refrigeration unit 28 is currently outside a select range of conditions, the diagnostic module 92 may activate the alarm 100 immediately to avoid further damage to the component.

Advantageously, as provided herein, the equipment management system 90 may help to better predict maintenance schedules and reduce unplanned down time of the transport refrigeration system. In some embodiments, advantageously, the equipment management system 90 may help in re-routing transport refrigeration systems 20 so they do not embark on a journey that the transport refrigeration unit 28 cannot complete.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for managing transport refrigeration units, the system comprising:
    a storage device to store transport parameters associated with a transport refrigeration unit and a maintenance history of the transport refrigeration unit, the storage device storing historical transport parameters for other transport refrigeration units, wherein the transport parameters comprise weather data experienced by the transport refrigeration unit and at least one of:
        an operating temperature of the transport refrigeration unit, operating vibrations of the transport refrigeration unit, an operating pressure of the transport refrigeration unit, operation cycles of the transport refrigeration unit, an operation duration of the transport refrigeration unit, and a location of the transport refrigeration unit;
    an equipment management system coupled to the storage device, the equipment management system including:
        a processor; and
        a memory comprising computer-executable instructions that, when executed by the processor, cause the processor to perform operations, the operations comprising:
            determining a condition of the transport refrigeration unit in response to the transport parameters;
            determining a need for upcoming maintenance of the transport refrigeration unit in response to the transport parameters;
            determining a remaining life of at least one component of the transport refrigeration unit in response to the transport parameters;
            adjusting a maintenance schedule of the transportation refrigeration unit in response to at least the maintenance history and the need for upcoming maintenance; and
            re-routing the transport refrigeration unit so that the transport refrigeration unit does not embark on a journey that the transport refrigeration unit cannot complete,
        wherein the weather data experienced by the transport refrigeration unit includes solar gain experienced by an environmentally controlled container operably associated with the refrigeration unit, the refrigeration unit being configured to control environmental conditions within the environmentally controlled container.

2. The system of claim 1, further comprising:
    an alarm configured to activate when the condition of the transport refrigeration unit is outside of a selected range of conditions.

3. The system of claim 1, further comprising:
    an alarm configured to activate when the need for upcoming maintenance of the transport refrigeration unit is determined.

4. The system of claim 1, further comprising:
    an alarm configured to activate when the remaining life of at least one component of the transport refrigeration unit equals a selected value.

5. The system of claim 1, wherein:
    the transport parameters include the location of the transport refrigeration unit.

6. The system of claim 1, wherein:
the transport parameters include quality inspections of perishable goods carried by the transport refrigeration unit.

7. The system of claim 1, wherein:
the transport parameters include manually entered data.

8. A method of managing transport refrigeration units, the method comprising:
storing, using a storage device, transport parameters associated with a transport refrigeration unit and a maintenance history of the transport refrigeration unit, the storage device storing historical transport parameters for other transport refrigeration units, wherein the transport parameters comprise weather data experienced by the transport refrigeration unit and at least one of:
an operating temperature of the transport refrigeration unit, operating vibrations of the transport refrigeration unit, an operating pressure of the transport refrigeration unit, operation cycles of the transport refrigeration unit, an operation duration of the transport refrigeration unit, and a location of the transport refrigeration unit;
monitoring, using an equipment management system, the transport refrigeration unit, the equipment management system coupled to the storage device, the equipment management system including:
a processor; and
a memory comprising computer-executable instructions that, when executed by the processor, cause the processor to perform operations, the operations comprising:
determining a condition of the transport refrigeration unit in response to the transport parameters;
determining a need for upcoming maintenance of the transport refrigeration unit in response to the transport parameters;
determining a remaining life of at least one component of the transport refrigeration unit in response to the transport parameters;
adjusting a maintenance schedule of the transportation refrigeration unit in response to at least the maintenance history and the need for upcoming maintenance; and
re-routing the transport refrigeration unit so that the transport refrigeration unit does not embark on a journey that the transport refrigeration unit cannot complete,
wherein the weather data experienced by the transport refrigeration unit includes solar gain experienced by an environmentally controlled container operably associated with the refrigeration unit, the refrigeration unit being configured to control environmental conditions within the environmentally controlled container.

9. The method of claim 8, further comprising:
activating an alarm when the condition of the transport refrigeration unit is outside of a selected range of conditions.

10. The method of claim 8, further comprising:
activating an alarm when the need for upcoming maintenance of the transport refrigeration unit is determined.

11. The method of claim 8, further comprising:
activating an alarm when the remaining life of at least one component of the transport refrigeration unit equals a selected value.

12. The method of claim 8, wherein:
the transport parameters include the location of the transport refrigeration unit.

13. The method of claim 8, wherein:
the transport parameters include quality inspections of perishable goods carried by the transport refrigeration unit.

14. The method of claim 8, wherein:
the transport parameters include manually entered data.

* * * * *